(12) United States Patent
Yoon et al.

(10) Patent No.: US 12,427,852 B2
(45) Date of Patent: Sep. 30, 2025

(54) DRIVING MODULE AND MOBILE BODY INCLUDING SAME

(71) Applicants: Hyundai Motor Company, Seoul (KR); Kia Corporation, Seoul (KR)

(72) Inventors: Dae Keun Yoon, Gunpo-si (KR); Eun Ho Seo, Gwangmyeong-si (KR); Geun Sang Yu, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 323 days.

(21) Appl. No.: 18/201,582

(22) Filed: May 24, 2023

(65) Prior Publication Data
US 2024/0270063 A1    Aug. 15, 2024

(30) Foreign Application Priority Data

Feb. 10, 2023 (KR) .................. 10-2023-0018312

(51) Int. Cl.
*B60K 7/00*     (2006.01)

(52) U.S. Cl.
CPC ...... *B60K 7/0007* (2013.01); *B60K 2007/003* (2013.01); *B60K 2007/0038* (2013.01); *B60K 2007/0061* (2013.01)

(58) Field of Classification Search
CPC ............ B60K 7/0007; B60K 2007/003; B60K 2007/0038; B60K 2007/0061
See application file for complete search history.

(56) References Cited

U.S. PATENT DOCUMENTS

| | | | |
|---|---|---|---|
| 7,426,970 B2* | 9/2008 | Olsen | B60K 7/0007 180/908 |
| 8,172,026 B2 | 5/2012 | Yamazaki | |
| 9,169,005 B2* | 10/2015 | Oswald | F16H 48/08 |
| 9,909,633 B2 | 3/2018 | Tanahashi et al. | |
| 11,491,989 B2 | 11/2022 | Ko et al. | |
| 12,311,697 B2* | 5/2025 | Blom | B60B 33/0068 |
| 2008/0223638 A1* | 9/2008 | Niwa | B60K 7/0007 180/65.51 |
| 2010/0147101 A1 | 6/2010 | Yamazaki | |
| 2013/0200210 A1 | 8/2013 | Oswald et al. | |

(Continued)

FOREIGN PATENT DOCUMENTS

JP        5519076 B2    6/2014
KR    10-2009-0092323 A    8/2009

(Continued)

*Primary Examiner* — Erez Gurari
(74) *Attorney, Agent, or Firm* — Banner & Witcoff, Ltd.

(57) ABSTRACT

A driving module includes a wheel unit, a first driving unit, a second driving unit, and a third driving unit. The wheel unit includes a traveling wheel that has a center through which a wheel rotation axis passes. The first driving unit includes a first shaft member that is coupled to the wheel unit so that rotation driving force about a first rotation axis eccentric from the wheel rotation axis in a radial direction of the wheel unit is applied to the wheel unit to thereby rotate the traveling wheel about the wheel rotation axis. The second driving unit is coupled to the wheel unit to rotate the wheel unit about the first rotation axis and having a cavity through which the first shaft member passes. The third driving unit is configured to steer the wheel unit about a second rotation axis perpendicular to the first rotation axis.

11 Claims, 11 Drawing Sheets

(56) References Cited

U.S. PATENT DOCUMENTS

| | | | | |
|---|---|---|---|---|
| 2014/0284421 | A1* | 9/2014 | Osman | B64C 25/405 244/50 |
| 2016/0009383 | A1 | 1/2016 | Oswald et al. | |
| 2016/0230824 | A1 | 8/2016 | Tanahashi et al. | |
| 2018/0022197 | A1* | 1/2018 | Bewley | B60K 7/0007 180/21 |
| 2018/0099555 | A1* | 4/2018 | Yang | B62D 7/026 |
| 2020/0386301 | A1* | 12/2020 | Kishida | B60B 35/14 |
| 2021/0061284 | A1 | 3/2021 | Ko et al. | |
| 2021/0162857 | A1* | 6/2021 | Obermeyer | B60K 7/0007 |
| 2022/0266669 | A1 | 8/2022 | Yu et al. | |
| 2022/0266892 | A1* | 8/2022 | Yu | B62D 5/0481 |
| 2022/0379716 | A1* | 12/2022 | Yan | B60K 7/0007 |
| 2024/0270063 | A1* | 8/2024 | Yoon | B60K 7/0007 |
| 2024/0278640 | A1* | 8/2024 | Cho | B62D 7/1509 |

FOREIGN PATENT DOCUMENTS

| | | |
|---|---|---|
| KR | 10-2016-0098078 A | 8/2016 |
| KR | 10-2021-0026249 A | 3/2021 |
| KR | 10-2022-0121076 A | 8/2022 |
| KR | 10-2022-0121078 A | 8/2022 |

\* cited by examiner

DRIVING MODULE AND MOBILE BODY INCLUDING SAME

CROSS-REFERENCE TO RELATED APPLICATION(S)

This application claims priority from and the benefit of Korean Patent Application No. 10-2023-0018312, filed on Feb. 10, 2023, which is hereby incorporated by reference in its entirety herein.

TECHNICAL FIELD

Examples relate to a driving module and a mobile body including same.

BACKGROUND

The paradigm is changing from internal combustion engine vehicles powered by internal combustion engines to electric vehicles powered by electric motors. With the spread of electric vehicles, demand for mobile bodies (e.g., vehicles) equipped with autonomous driving functions are increasing, and accordingly, research on mobile bodies using electric motors as a power source is being actively conducted.

These mobile bodies may be used in various applications. For example, the mobile bodies may be used to transport people and/or to transport and/or deliver cargo, such as goods. However, mobility of mobile bodies may be limited by the environment of the ground on which the mobile bodies are intended to travel, and this may create an obstacle when developing and/or designing the mobile bodies.

SUMMARY

The following summary presents a simplified summary of certain features. The summary is not an extensive overview and is not intended to identify key or critical elements.

Systems, apparatuses, and methods are described for a driving module and a mobile body comprising the same. A driving module may comprise a wheel unit comprising a traveling wheel configured to rotate about a wheel rotation axis that passes through a center of the traveling wheel, a first motor comprising a first shaft coupled to the wheel unit so as to be configured to cause a rotation driving force, about a first rotation axis eccentric from the wheel rotation axis in a radial direction of the wheel unit, to be applied to the wheel unit in a way to cause the traveling wheel to rotate about the wheel rotation axis, a second motor coupled to the wheel unit and configured to cause the wheel unit to rotate about the first rotation axis, wherein the second motor forms a cavity through which the first shaft passes; and a third motor configured to cause the wheel unit to rotate about a second rotation axis perpendicular to the first rotation axis.

A mobile body may comprise a vehicle body; and a plurality of driving modules coupled to the vehicle body. Each of the driving modules may comprise a wheel unit comprising a traveling wheel having an annular shape centered about a wheel rotation axis, a first motor comprising a first shaft coupled to the wheel unit so as to be configured to cause a rotation driving force, about a first rotation axis eccentric from the wheel rotation axis in a radial direction of the wheel unit, to be applied to the wheel unit in a way to cause the traveling wheel to rotate about the wheel rotation axis, a second motor coupled to the wheel unit and configured to cause the wheel unit to rotate about the first rotation axis, wherein the second motor forms a cavity through which the first shaft passes; and a third motor configured to cause the wheel unit to rotate about a second rotation axis perpendicular to the first rotation axis.

These and other features and advantages are described in greater detail below.

BRIEF DESCRIPTION OF THE DRAWINGS

The accompanying drawings, which are included to provide a further understanding of the disclosure and are incorporated in and constitute a part of this specification, illustrate examples of the disclosure, and together with the description serve to explain the principles of the disclosure.

DETAILED DESCRIPTION

Hereinafter, examples of the present disclosure will be described in more detail with reference to the accompanying drawings. When reference numerals are given to elements in each drawing, it should be noted that the same elements will be designated by the same reference numerals if possible although they are shown in different drawings. Also, in describing examples of the present disclosure, a detailed description of related known configurations or functions will be omitted when it is determined that the understanding of the examples of the present disclosure would be hindered by the detailed description.

In describing components of examples of the present disclosure, terms such as first, second, A, B, (a), (b), and the like, may be used. These terms are only used to distinguish one component from other components, and the characteristics, orders, or sequences of the corresponding components are not limited by the terms.

When one component is described as being "connected," "coupled," or "linked" to another component, this component may be directly connected or linked to another component, but it should be understood that other components may be "connected," "coupled," or "linked" between these components, unless it is explicitly stated that the component is "directly connected, "directly coupled," or "directly linked" to the other component.

For a mobile body comprising a wheel configured to be rotated by using a shaft member (e.g., an axle) that is connected to the wheel so as to be aligned with a rotation axis of the wheel, a problem may arise in which the shaft member may be interfered with or is obstructed by features of a ground to be traveled on by the mobile device. An in-wheel motor may be also or alternatively provided inside and/or on a wheel, configured to rotate the wheel, and a mobile body may thereby be adapted to various environments by changing the location at which the wheel and the mobile body are connected to each other.

However, an in-wheel motor located inside and/or on the wheel may increase an overall weight of the wheel to be rotated, and rotational inertia may also increase. As the inertia increases, it becomes difficult to keep the overall balance of the mobile body.

In addition, wires may be provided inside the wheel to supply power to the in-wheel motor, but the wires may be damaged by the wheel, e.g., during motion. A slip ring may be used to eliminate the use of wires. However, the slip ring may not be able to transmit sufficiently high-capacity power, may be vulnerable to interference, and/or may easily lose its function due to wear and the like without regular maintenance.

Figure 1:
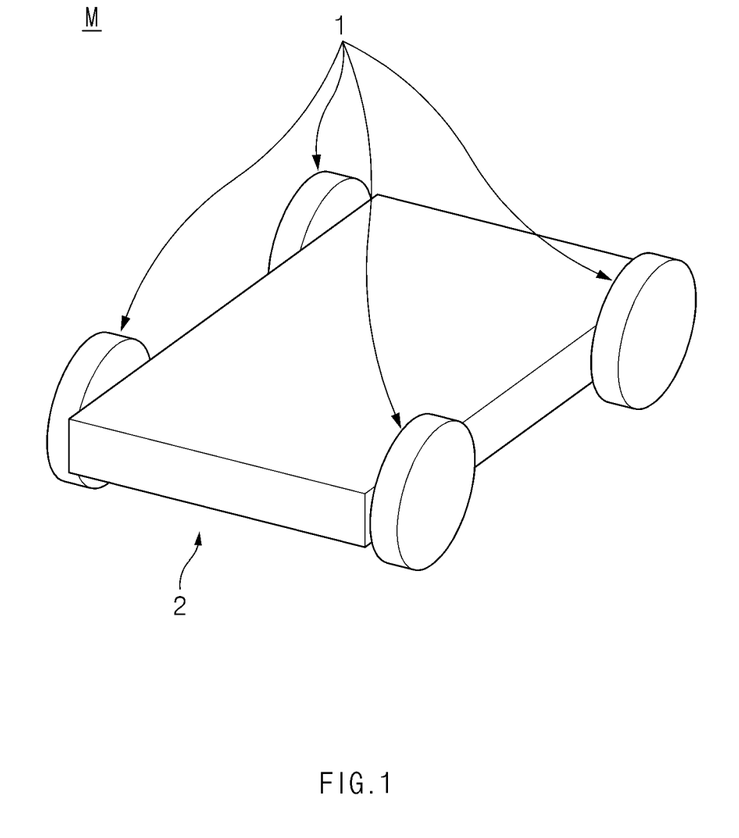
FIG. 1 is a view conceptually showing a mobile body according to an example of the present disclosure.

FIG. 1 is a view conceptually showing a mobile body M according to an example of the present disclosure.

A mobile body M according to an example of the present disclosure may include a vehicle body 2 and a plurality of driving modules 1. In the drawing, a total of four driving modules 1 are illustrated as being coupled to the front left end, front right end, rear left end, and rear right end of a single vehicle body 2, but the number and arrangement of driving modules 1 and/or vehicle bodies 2 are not limited thereto.

The vehicle body 2 may comprise a component for seating and transporting objects and/or people. In the drawing, the vehicle body 2 is formed in a plate shape and is illustrated as a form in which an object and/or person may be easily seated and/or accommodated and/or supported. In addition, the vehicle body 2 may further include a component for preventing the object or person from falling and/or a structure in which an object and/or person may be easily seated, accommodated and/or supported.

A steering device may be connected to the vehicle body 2. In order to change a movement of a wheel unit 10 by manipulating the steering device, the steering device may be physically or electrically connected to a first driving unit 20, a second driving unit 30, and/or a third driving unit 40, each of which are described below. Also, the steering device may be electrically connected to (and/or comprise) a processor configured to control (e.g., remotely) the third driving unit 40 to thereby perform steering. The steering device may be configured as a steering wheel that may be gripped and moved (e.g., rotated) by a user, but the shape of the steering device is not limited thereto.

Figure 2:
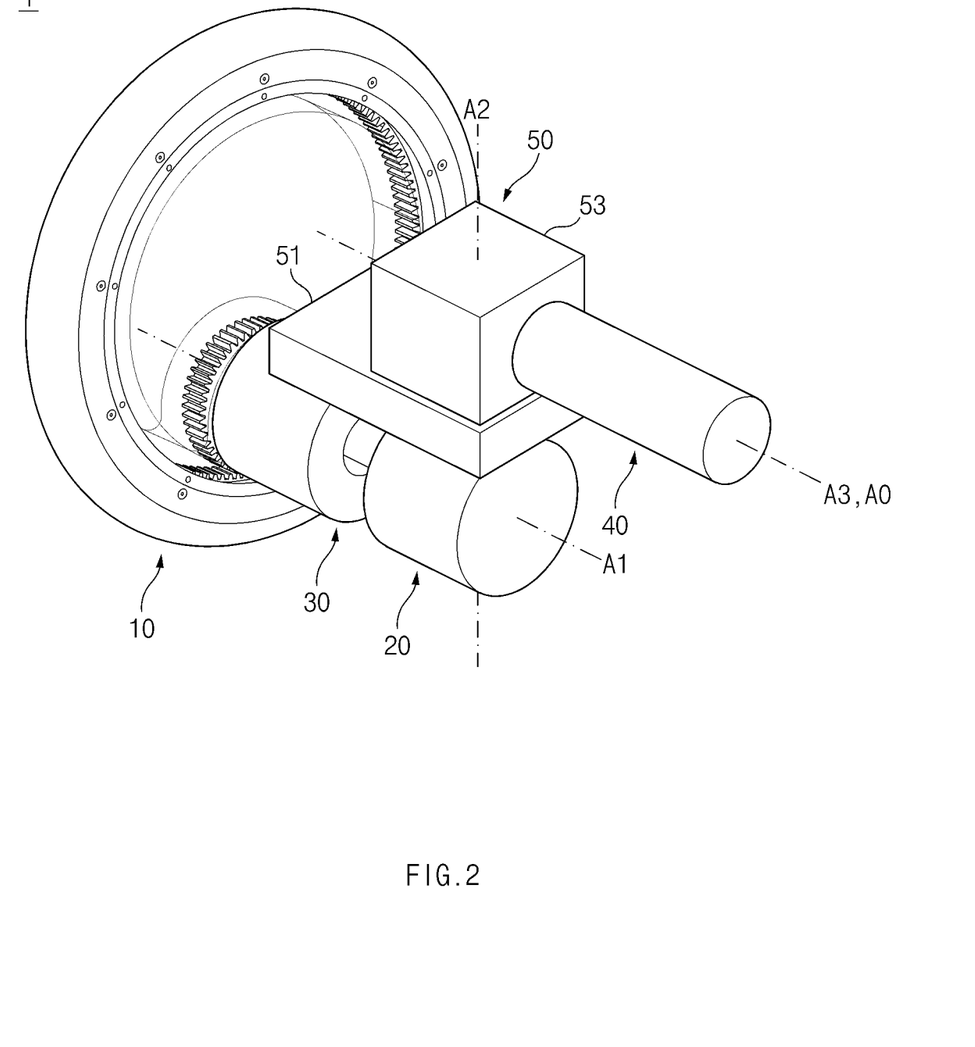
FIG. 2 is a perspective view of a driving module according to an example of the present disclosure.
Figure 3:
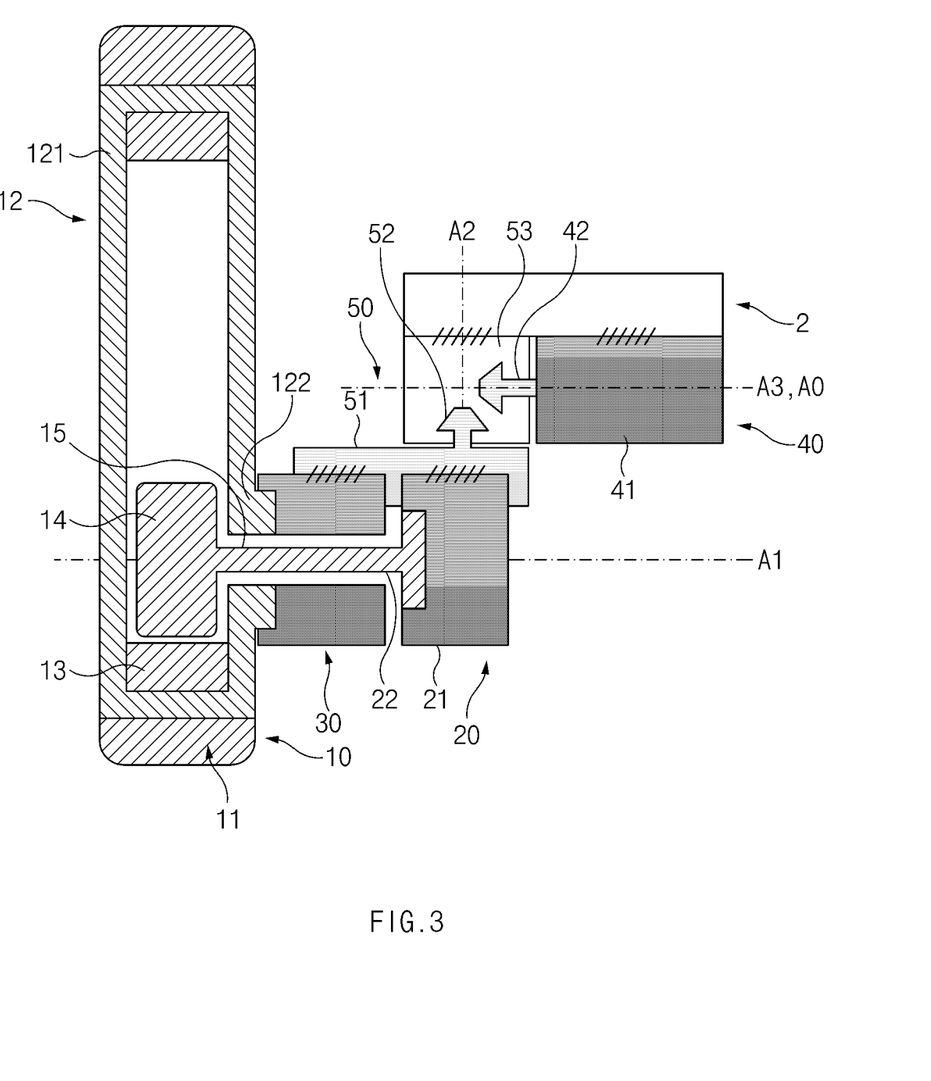
FIG. 3 is a view conceptually showing a vertical cross-section of a driving module according to an example of the present disclosure.

FIG. 2 is a perspective view of a driving module 1 according to an example of the present disclosure. FIG. 3 is a view conceptually showing a vertical cross-section of the driving module 1 according to an example of the present disclosure.

Referring to the drawings, the driving module 1 according to an example of the present disclosure includes a wheel unit 10, a first driving unit 20, a second driving unit 30, and a third driving unit 40.

Wheel Unit 10

Figure 4:
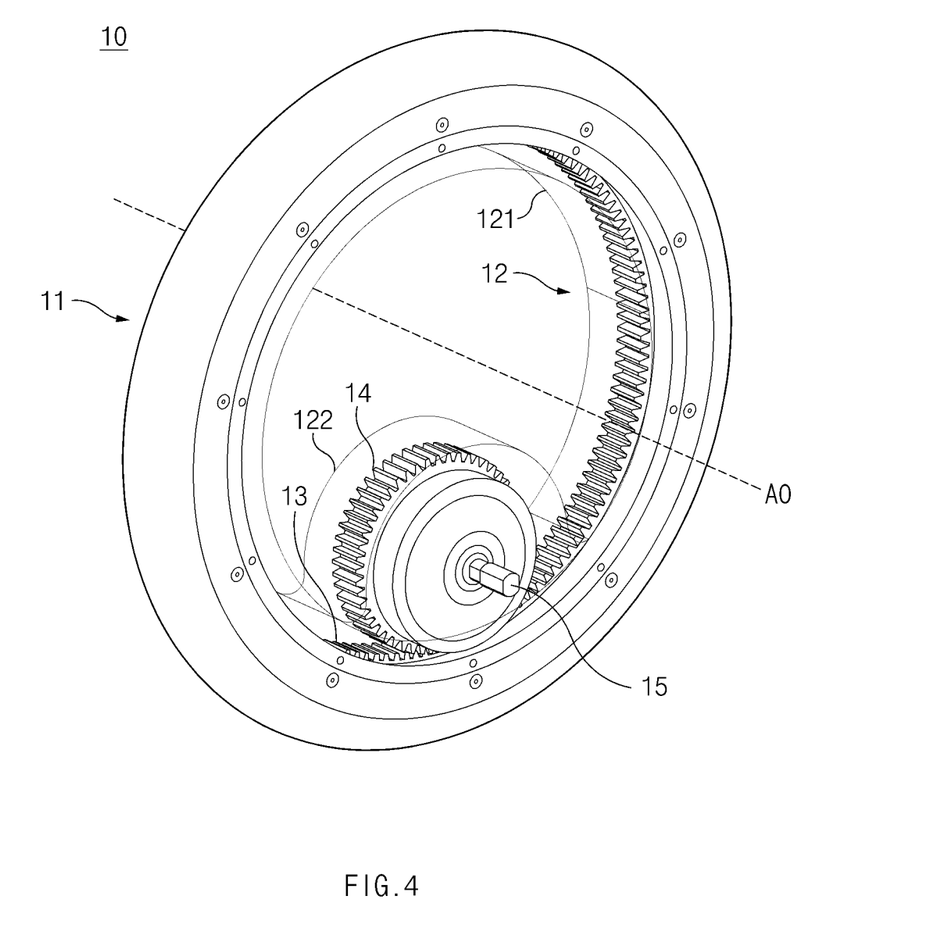
FIG. 4 is a perspective view showing the internal structure of a wheel unit according to an example of the present disclosure.

FIG. 4 is a perspective view showing the internal structure of the wheel unit 10 according to an example of the present disclosure.

The wheel unit 10 is configured to serve as a wheel having a center through which a wheel rotation axis A0 passes about which the wheel unit 10 is configured to rotate. Therefore, the wheel unit 10 may have a circular outer boundary that has a center through which the wheel rotation axis A0 passes. Herein, a rotation axis represents a virtual axis that is the center of rotation of a corresponding component.

The wheel unit 10 comprises a traveling wheel 11. The traveling wheel 11 may be formed in an annular shape. The traveling wheel 11 may be located on the outermost side of the wheel unit 10 and may have a circular ring shape, and may have a circular outer boundary that is centered on the center of the wheel unit 10 (e.g., so as to be rotatable about axis A0). The traveling wheel 11 may be configured to contact the ground and may rotate to drive the vehicle body 2. The traveling wheel 11 may comprise an elastic material, but the material is not limited thereto.

The wheel unit 10 may include a wheel gear 13. The wheel gear 13 may have an annular shape and may be located on the inner surface of the traveling wheel 11. The wheel gear 13 may be rotated by a first shaft member 22, described below (e.g., with respect to FIG. 5). Gear teeth may be provided on the inner surface of the wheel gear 13, and a transmission gear 14 may be configured to connect the first shaft member 22 to the wheel gear 13 (see, e.g., FIGS. 3 and 6). When the first shaft member 22 rotates about a first rotation axis A1 (see, e.g., FIGS. 2-3), the transmission gear 14 operating in conjunction with the rotation of the first shaft member 22 also rotates about the first rotation axis A1. Accordingly, the wheel gear 13 engaging therewith rotates about the wheel rotation axis A0, and the traveling wheel 11, operating in conjunction with the wheel gear 13, also rotates about the wheel rotation axis A0. The first rotation axis A1 is eccentric from the wheel rotation axis A0 in a radial direction of the wheel unit 10.

The wheel unit 10 may comprise a transmission gear 14. The transmission gear 14 may be coupled to the first shaft member 22 so as to rotate about the first rotation axis A1 and may engage with the gear teeth on the inner surface of the wheel gear 13. Therefore, gear teeth may be provided on the outer surface of the transmission gear 14, and the first rotation axis A1 may pass through the center of the transmission gear 14 (see, e.g., FIG. 3). The rotation driving force generated by the rotation of the first shaft member 22 about the first rotation axis A1 is transmitted to the wheel gear 13 via the transmission gear 14, and may rotate the wheel gear 13 about the wheel rotation axis A0.

The wheel unit 10 may include a transmission shaft member 15. The transmission shaft member 15 may protrude from the center of the transmission gear 14 toward the first driving unit 20, and may be coupled with the first shaft member 22 of the first driving unit 20. However, the first shaft member 22 may be directly coupled to the center of the transmission gear 14 without the transmission shaft member 15.

The wheel unit 10 may include a wheel frame 12. The wheel frame 12 may cover the inner surface of the traveling wheel 11 and/or provide a space in which the wheel gear 13 is accommodated. The transmission gear 14 may also be accommodated in the space.

In order to provide the space in which the transmission gear 14 is accommodated, the wheel frame 12 may have a transmission cover 122 that protrudes further inward radially than a wheel cover 121 that covers only the wheel gear 13. The transmission cover 122 may have a shape corresponding to the exterior of the transmission gear 14, and may convexly protrude inward from the wheel unit 10.

The wheel frame 12 may have an annular shape with an open center. The traveling wheel 11 may be rotatably coupled to the outer surface of the wheel frame 12. The traveling wheel 11 may be coupled to the wheel frame 12 so as to be rotatable about the wheel rotation axis A0, but the wheel frame 11 may not be separated from the wheel frame 12 along the wheel rotation axis A0.

The wheel frame 12 may be coupled to the second driving unit 30 so as to be rotatable by the second driving unit 30. The second driving unit 30 may be coupled to the transmission cover 122 and may be configured to change the relative positions of the wheel unit 10 and the vehicle body 2. A detailed operation of the second driving unit 30 is described below in the description of the second driving unit 30.

First Driving Unit 20

Figure 5:
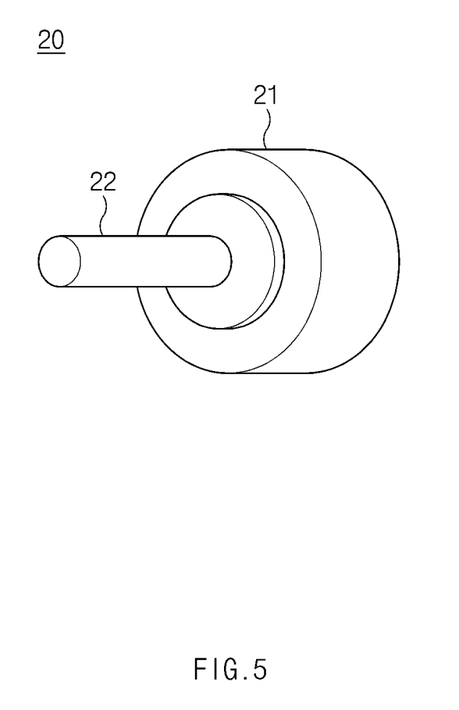
FIG. 5 is a view conceptually showing a first driving unit according to an example of the present disclosure.
Figure 6:
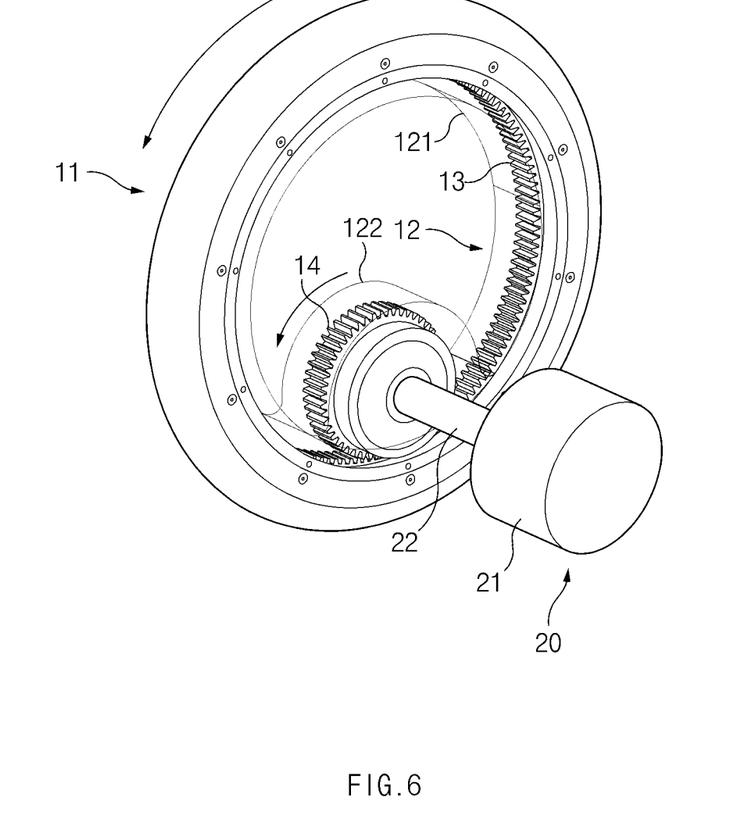
FIG. 6 is a perspective view showing a state in which a wheel unit and a first driving unit according to an example of the present disclosure are coupled to each other.

FIG. 5 is a view conceptually showing the first driving unit 20 according to an example of the present disclosure. FIG. 6 is a perspective view showing a state in which the wheel unit 10 and the first driving unit 20 according to an example of the present disclosure are coupled to each other.

The first driving unit 20 is a component configured to rotate the traveling wheel 11 about the wheel rotation axis A0 to drive same. The first driving unit 20 may include a first driving member 21 configured to generate driving force. The first driving member 21 may include a motor, but the type is not limited thereto as long as rotation driving force is generated.

The first driving unit 20 includes a first shaft member 22 (e.g., a shaft) coupled to the wheel unit 10 so that the rotation driving force about the first rotation axis A1 generated by the first driving member 21 is applied to the wheel unit 10 to thereby rotate the traveling wheel 11 about the wheel rotation axis A0. The first shaft member 22 may protrude from the first driving unit 20 toward the wheel unit 10 along the first rotation axis A1. The first shaft member 22 may be coupled to the transmission shaft member 15 and indirectly connected to the transmission gear 14 (through the transmission shaft member 15), or directly coupled to the transmission gear 14.

As the first driving member 21 operates, the rotation driving force about the first rotation axis A1 is transmitted to the transmission gear 14 via the first shaft member 22. The transmission gear 14 rotates about the first rotation axis A1 so that the wheel gear 13 rotates about the wheel rotation axis A0. Accordingly, the traveling wheel 11 may travel while rotating about the wheel rotation axis A0. Here, the wheel frame 12 may not have a relative motion with respect to the first driving unit 20.

Second Driving Unit 30

Figure 7:
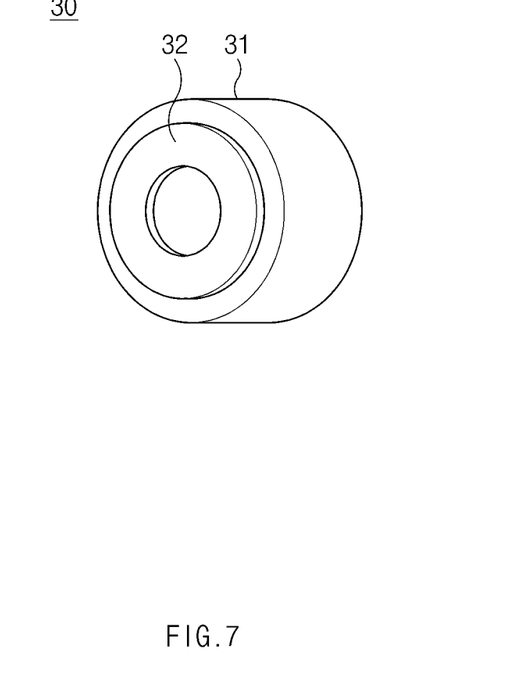
FIG. 7 is a view conceptually showing a second driving unit according to an example of the present disclosure.
Figure 8:
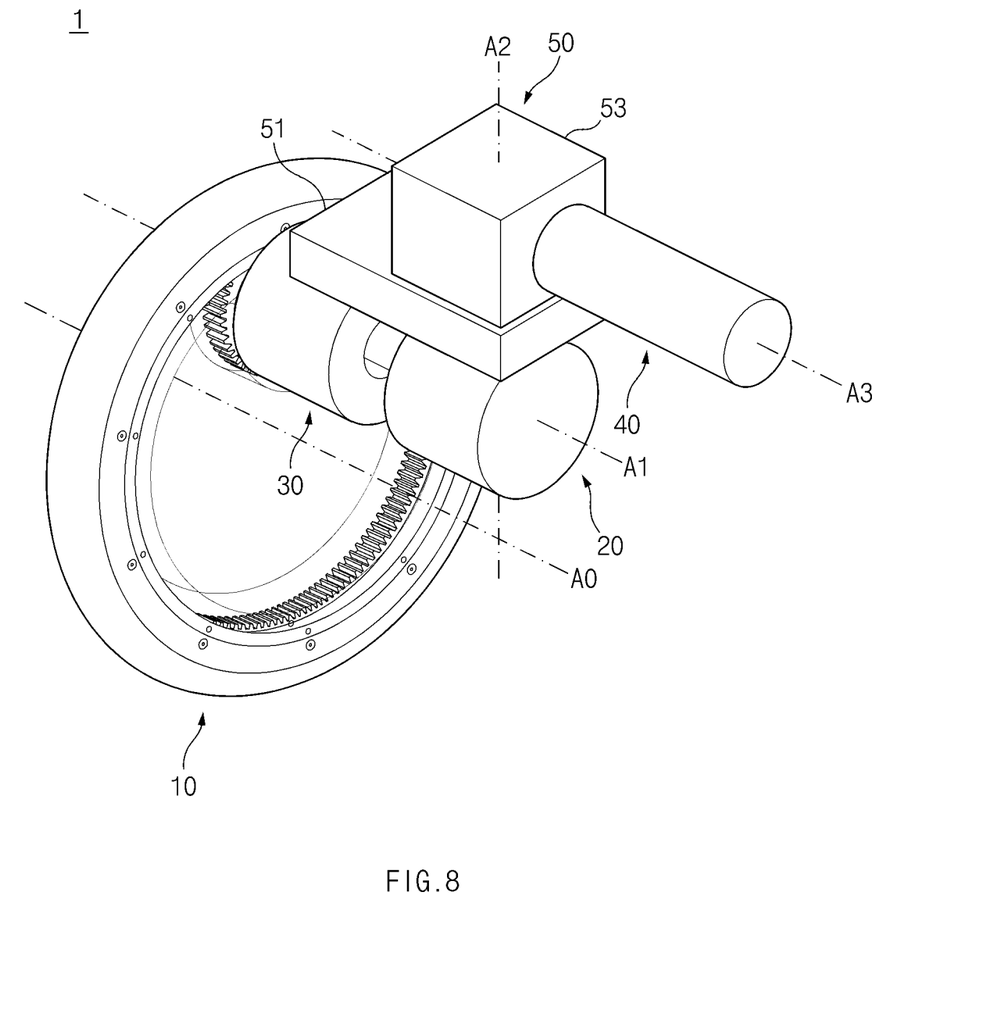
FIG. 8 is a perspective view showing a state in which a first driving unit, a second driving unit, and a third driving unit are located at positions different from those of FIG. 2 by driving the second driving unit according to an example of the present disclosure.

FIG. 7 is a view conceptually showing the second driving unit 30 according to an example of the present disclosure. FIG. 8 is a perspective view showing a state in which the first driving unit 20, the second driving unit 30, and the third driving unit 40 are located at positions different from those of FIG. 2 by driving the second driving unit 30 according to an example of the present disclosure.

The second driving unit 30 may be a component configured to rotate the wheel unit 10 about the first rotation axis A1. The second driving unit 30 may include a second driving member 31 (e.g., a motor) configured to generate driving force and provides a cavity formed along the first rotation axis A1. The second driving member 31 may include a hollow motor having a cavity, but the type is not limited thereto as long as the second driving member 31 has a cavity and generates rotation driving force. The first shaft member 22 may pass through the cavity.

The second driving unit 30 includes a second shaft member 32 (e.g., a shaft) coupled to the wheel unit 10 so that the rotation driving force about the first rotation axis A1 generated by the second driving member 31 is applied to the wheel unit 10 to thereby rotate the wheel unit 10 about the first rotation axis A1. The second shaft member 32 may protrude from the second driving unit 30 (e.g., from the second driving member 31) toward the wheel unit 10 along the first rotation axis A1. The second shaft member 32 may be coupled to the transmission cover 122 and thereby configured to rotate the wheel unit 10 about the first rotation axis A1, thereby changing the relative position of the wheel unit 10 and the vehicle body 2.

The second shaft member 32 may also form a cavity together with the second driving member 31. Thus, the first shaft member 22, when inserted in the second driving unit 30, may be surrounded by the second shaft member 32 and the second driving member 31. That is, on the basis of one direction along the first rotation axis A1, components are arranged in the order of the first driving member 21, the second driving unit 30, and the wheel unit 10, with the first rotation axis A1 passing through the second driving unit 30 (see, e.g., FIGS. 3, 8). Due to the arrangement of components including a component having the cavity, the traveling of the wheel unit 10 and the change in the relative position of the wheel unit 10 with respect to the vehicle body 2 may be performed by using the driving units arranged outside the wheel unit 10 without the need to equip the wheel unit 10 with an in-wheel motor. Therefore, since the driving module 1 and the mobile body M do not have an in-wheel motor, the wheel unit 10 may be reduced in weight. In addition, there is no need to place a wire for supplying power into the wheel unit 10 or use a slip ring.

As the second driving member 31 operates, the rotation driving force about the first rotation axis A1 may be transmitted to the transmission cover 122 via the second shaft member 32. Also, as the wheel unit 10 rotates about the first rotation axis A1, the relative position of the wheel unit 10 with respect to the vehicle body 2 may be changed. Therefore, the wheel unit 10 may have adjustable positions relative to the vehicle body 2, e.g., as shown in FIGS. 2 and 8.

Third Driving Unit 40

Figure 9:
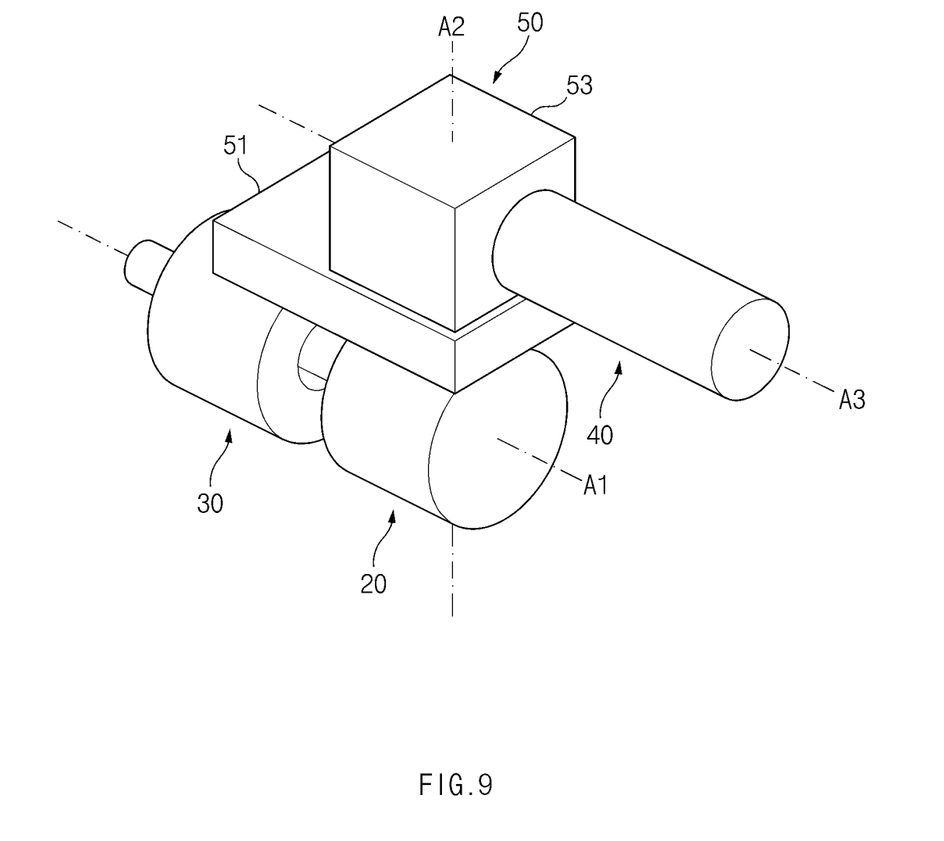
FIG. 9 is a view conceptually showing a first driving unit, a second driving unit, a third driving unit, and a connection unit according to an example of the present disclosure.
Figure 10:
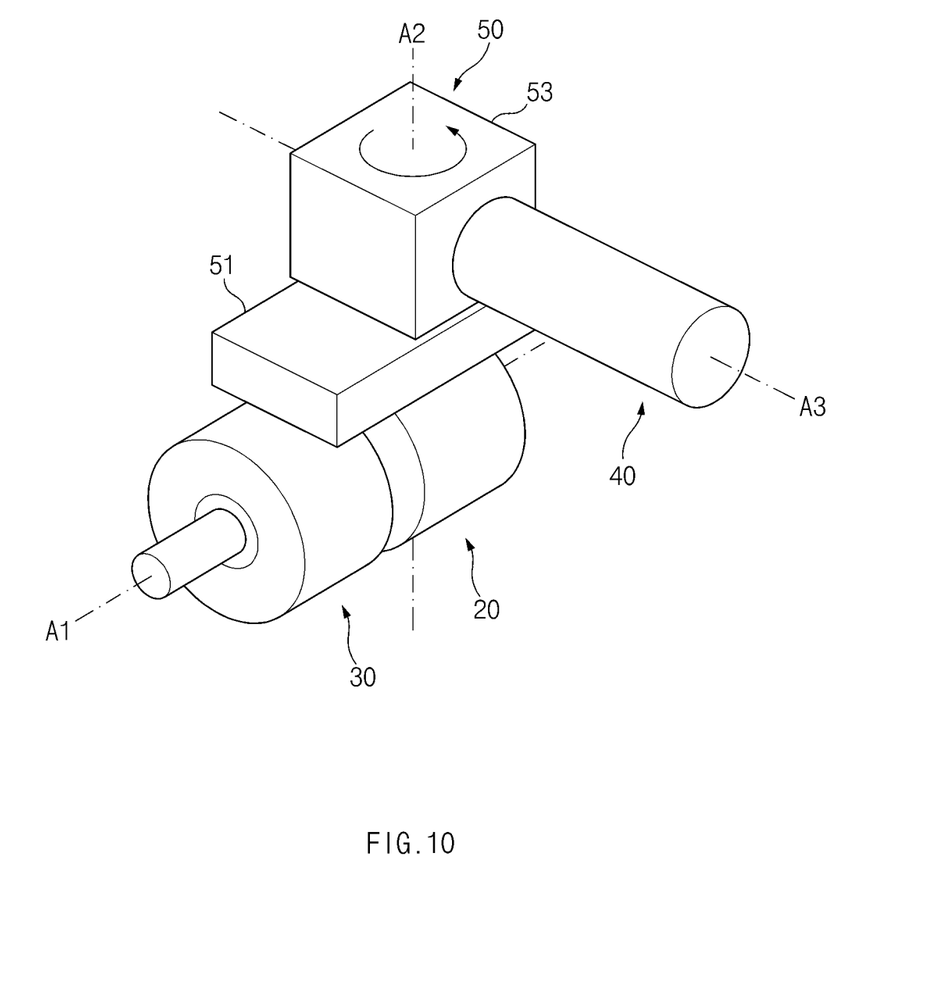
FIG. 10 is a view conceptually showing a state in which a first driving unit, a second driving unit, and a connection unit according to an example of the present disclosure are oriented in directions different from those of FIG. 9 by the driving of a third driving unit.

FIG. 9 is a view conceptually showing a first driving unit 20, a second driving unit 30, a third driving unit 40, and a connection unit 50 according to an example of the present disclosure. FIG. 10 is a view conceptually showing a state in which the first driving unit 20, the second driving unit 30, and the connection unit 50 according to an example of the present disclosure are oriented in directions different from those of FIG. 9 by the driving of the third driving unit 40.

The third driving unit 40 may be a component configured to rotate and steers the wheel unit 10 about a second rotation axis A2 perpendicular to the first rotation axis A1. The third driving unit 40 may include a third driving member 41 configured to generate driving force. The third driving member 41 may include a means to generate a rotation driving force (e.g., a motor).

The third driving unit 40 may include a third shaft member 42 (e.g., a shaft) coupled to the connection unit 50 (described below) so that the rotation driving force about a third rotation axis A3 may be generated by the third driving member 41 and applied to the connection unit 50 to thereby rotate the connection unit 50 and the wheel unit 10 about the second rotation axis A2. The third shaft member 42 may protrude from the third driving unit 40 toward the wheel unit 10 along the third rotation axis A3. The third rotation axis A3 may be parallel to the first rotation axis A1. The third rotation axis A3 may be aligned with the wheel rotation axis A0.

As the third driving member 41 operates, the rotation driving force about the third rotation axis A3 is transmitted to the connection unit 50 via the third shaft member 42. In addition, the first driving unit 20 and the second driving unit 30 are rotated about the second rotation axis A2 by the connection unit 50, and the wheel unit 10 coupled to both the first driving unit 20 and the second driving unit 30 are rotated about the second rotation axis A2. Accordingly, steering according to a change in directions as shown in FIGS. 9 and 10 may be performed. As the steering is performed, the first rotation axis A1 and the wheel rotation axis A0 rotate about the second rotation axis A2.

The third driving unit 40 may be coupled to the vehicle body 2. The third driving unit 40 may be coupled to the lower surface of the vehicle body 2 (e.g., as shown in FIG. 3), but the coupled position is not limited thereto.

Connection Unit 50

The connection unit 50 may be configured such that steering is generated by the third driving unit 40. The connection unit 50 may include a fixed portion 51 and a connection protrusion portion 52. The fixed portion 51 may be connected to the first driving unit 20 and the second driving unit 30. The fixed portion 51 may have a generally plate shape perpendicular to the second rotation axis A2 and may be coupled to the upper surfaces of the first driving unit 20 and the second driving unit 30, but the shape and coupling positions are not limited thereto.

The connection protrusion portion 52 may protrude from the fixed portion 51 and engage with the third driving unit 40. The connection protrusion portion 52 may engage with the third shaft member 42 so as to be rotated about the second rotation axis A2 by the third driving unit 40. That is, gear teeth may be provided on the third shaft member 42 and the connection protrusion portion 52, and the connection protrusion portion 52 may engage with the gear teeth provided at an end of the third shaft member 42. In addition, the rotation of the third shaft member 42 about the third rotation axis A3 may be converted to the rotation of the connection protrusion portion 52 about the second rotation axis A2. Therefore, the second rotation axis A2 may pass through the center of the connection protrusion portion 52, and the connection protrusion portion 52 and the third shaft member 42 may form a bevel gear.

The connection unit 50 may include a connection housing 53 having an inner space. The third shaft member 42 and the connection protrusion portion 52 may be located and protected in the inner space of the connection housing 53.

The connection unit 50 may be coupled to the vehicle body 2. The connection housing 53 of the connection unit 50 may be coupled to the lower surface of the vehicle body 2, but the coupling position is not limited thereto.

The connection unit 50 may be located outward from the third driving unit 40 on the basis of the vehicle body 2 (e.g., located closer to the wheel unit 10), and the second driving unit 30 may be located outward from the connection unit 50. However, the arrangements are not limited thereto.

ANOTHER EXAMPLE

Figure 11:
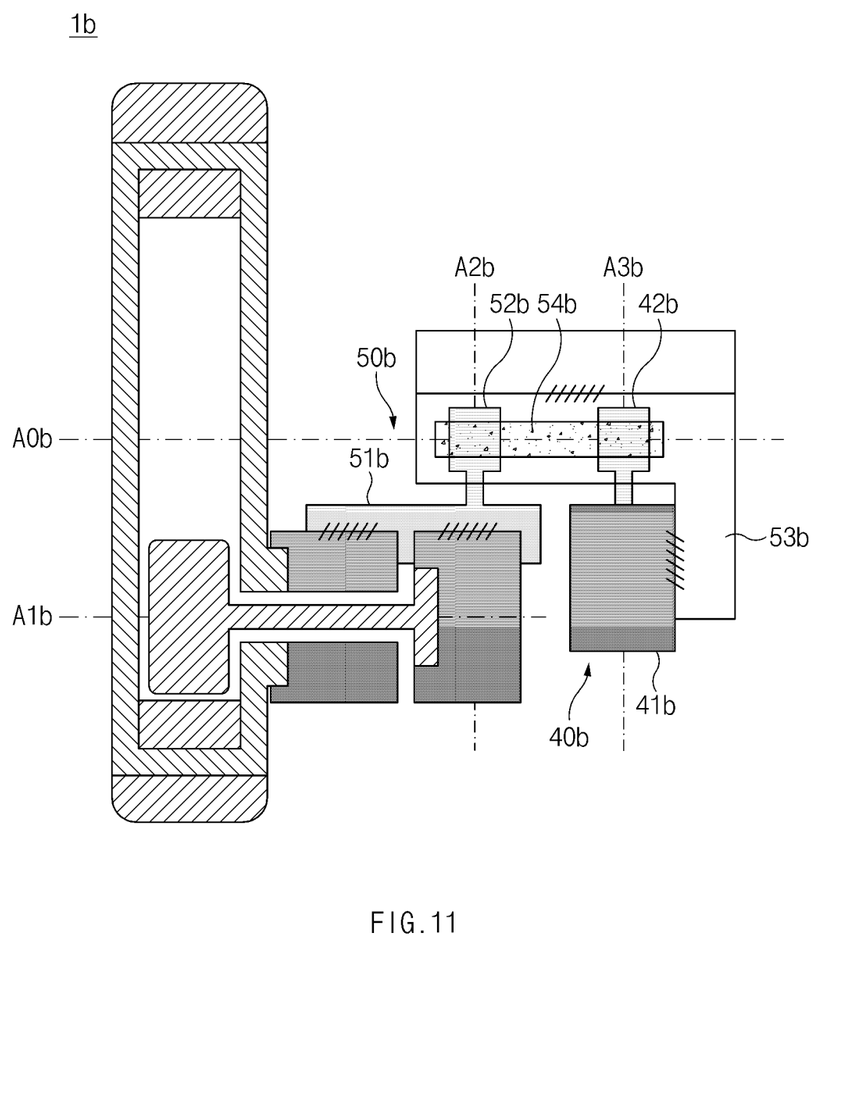
FIG. 11 is a view conceptually showing a vertical cross-section of a driving module according to another example of the present disclosure.

FIG. 11 is a view conceptually showing a vertical cross-section of the driving module 1*b* according to another example of the present disclosure.

The driving module 1*b* according to another example of the present disclosure differs from the driving module 1 according to the example of the present disclosure only in the configuration of a third driving unit 40*b* and a connection unit 50*b*. Therefore, only different parts therebetween are described, and common parts therebetween are substituted with the descriptions of the driving module 1 according to the above example of the present disclosure.

A third rotation axis A3*b*, which is a rotation axis of a third shaft member 42*b* (e.g., a shaft) of the third driving unit 40*b*, may be parallel to a second rotation axis A2*b* instead of a first rotation axis A1*b*. Therefore, the rotation driving force about the third rotation axis A3*b*, which may be generated by a third driving member 41*b* and transmitted to the third shaft member 42*b*, may be moved horizontally and transmitted to a connection protrusion portion 52*b*. A wheel rotation axis A0*b* may pass through the third shaft member 42*b* and the connection protrusion portion 52*b*.

To this end, the connection unit 50*b* of the driving module 1*b* according to this example of the present disclosure may include a connection belt 54*b*. The connection belt 54*b* may surround and connect the connection protrusion portion 52*b* and the third shaft member 42*b* to each other so that the connection protrusion portion 52*b* may be rotated about the second rotation axis A2*b* by the third driving unit 40*b*. The rotation driving force about the third rotation axis A3*b* of the third driving unit 40*b* may be transmitted to the connection protrusion portion 52*b* by the connection belt 54*b*. The connection belt 54*b* may include a timing belt, but the type is not limited thereto. The third shaft member 42*b* and the connection protrusion portion 52*b* may have a shape of a belt pulley, but the shape is not limited thereto.

The third driving unit 40*b* may be coupled to a connection housing 53*b*. The connection housing 53*b* may be bent in an 'L' shape to surround the third driving unit 40*b*.

Examples of the present disclosure provide a driving module, which may reduce the weight of a wheel and adapt to various environments without supplying power to the inside of the wheel, and a mobile body including same.

A first example of the present disclosure provides a driving module including: a wheel unit including a traveling wheel that has a center through which a wheel rotation axis passes; a first driving unit including a first shaft member that is coupled to the wheel unit so that rotation driving force about a first rotation axis eccentric from the wheel rotation axis in a radial direction of the wheel unit is applied to the wheel unit to thereby rotate the traveling wheel about the wheel rotation axis; a second driving unit coupled to the wheel unit to rotate the wheel unit about the first rotation axis and having a cavity through which the first shaft member passes; and a third driving unit configured to steer the wheel unit about a second rotation axis perpendicular to the first rotation axis.

A second example of the present disclosure provides a mobile body including: a vehicle body; and a plurality of driving modules coupled to the vehicle body, wherein each of the driving modules includes: a wheel unit including a traveling wheel having an annular shape; a first driving unit including a first shaft member that is coupled to the wheel unit so that rotation driving force about a first rotation axis eccentric from a wheel rotation axis in a radial direction of the wheel unit is applied to the wheel unit so as to rotate the traveling wheel about the wheel rotation axis; a second driving unit coupled to the wheel unit to rotate the wheel unit about the first rotation axis and having a cavity through which the first shaft member passes; and a third driving unit configured to steer the wheel unit about a second rotation axis perpendicular to the first rotation axis.

Accordingly, the driving module and the mobile body do not have an in-wheel motor, and thus, it is possible to cope with changes in external factors, such as the environment of the ground, without supplying power to the inside of the wheel having a reduced weight.

Even though all the components constituting an example of the present disclosure have been described as being combined as one body or operating in combination, the present disclosure is not necessarily limited to the example. That is, within the scope of the objectives of the present disclosure, all the components may be selectively combined into one or more and then operated. Also, terms such as "include," "constitute," or "have" described above may mean that the corresponding components may be included unless explicitly described to the contrary, and thus should be construed as further including other components rather than excluding other components. Unless otherwise defined, all terms including technical or scientific terms have the same meanings as those generally understood by a person skilled in the art to which the present disclosure pertains. Terms used generally such as terms defined in dictionaries should be interpreted as having the same meaning as in an associated technical context, and should not be understood abnormally or as having an excessively formal meaning unless defined apparently in the present disclosure.

The technical ideas of the present disclosure have been described merely for illustrative purposes, and those skilled in the art will appreciate that various changes and modifications are possible without departing from the essential features of the present disclosure. Therefore, the examples of the present disclosure are to be considered illustrative and not restrictive, and the technical idea of the present disclosure is not limited to the foregoing examples. The protective scope of the present disclosure is defined by the appended claims, and all technical ideas within their equivalents should be interpreted as being included in the scope of the present disclosure.

What is claimed is:

1. A driving module comprising:
   a wheel unit comprising a traveling wheel configured to rotate about a wheel rotation axis that passes through a center of the traveling wheel;
   a first motor comprising a first shaft coupled to the wheel unit so as to be configured to cause a rotation driving force, about a first rotation axis eccentric from the wheel rotation axis in a radial direction of the wheel unit, to be applied to the wheel unit in a way to cause the traveling wheel to rotate about the wheel rotation axis;
   a second motor coupled to the wheel unit and configured to cause the wheel unit to rotate about the first rotation axis, wherein the second motor forms a cavity through which the first shaft passes; and
   a third motor configured to cause the wheel unit to rotate about a second rotation axis perpendicular to the first rotation axis.

2. The driving module of claim 1, wherein the second motor comprises a hollow motor that forms the cavity and is configured to generate the rotation driving force.

3. The driving module of claim 1, wherein the third motor comprises a third shaft that is configured to rotate about a third rotation axis parallel to the first rotation axis.

4. The driving module of claim 3, further comprising a connection unit comprising a fixed portion, connected to both the first motor and the second motor, and a connection protrusion portion, which protrudes from the fixed portion and is configured to engage with the third motor so as to be rotated about the second rotation axis by the third motor.

5. The driving module of claim 1, wherein the third motor comprises a third shaft that is configured to rotate about a third rotation axis parallel to the second rotation axis.

6. The driving module of claim 5, further comprising a connection unit comprising a fixed portion, which is connected to both the first motor and the second motor, a connection protrusion portion, which protrudes from the fixed portion, and a connection belt, which connects the connection protrusion portion to the third motor so that the connection protrusion portion is rotatable about the second rotation axis by the third motor.

7. The driving module of claim 1, wherein the wheel unit further comprises a wheel gear that has an annular shape and is located on an inner surface of the traveling wheel, wherein the wheel gear is configured to be rotated by the first shaft.

8. The driving module of claim 7, wherein gear teeth are provided on an inner surface of the wheel gear, and
   wherein the wheel unit further comprises a transmission gear that is configured to engage with the gear teeth on the inner surface of the wheel gear and that is coupled to the first shaft so that the transmission gear rotates about the first rotation axis.

9. The driving module of claim 7, wherein the wheel unit further comprises a wheel frame that covers the inner surface of the traveling wheel and that forms a space configured to accommodate the wheel gear, and
   wherein the wheel frame is coupled to the second motor such that the wheel frame is configured to be rotated by the second motor.

10. The driving module of claim 9, wherein the wheel frame has an annular shape.

11. A mobile body comprising:
    a vehicle body; and
    a plurality of driving modules coupled to the vehicle body, wherein each of the driving modules comprises:
       a wheel unit comprising a traveling wheel having an annular shape centered about a wheel rotation axis;
       a first motor comprising a first shaft coupled to the wheel unit so as to be configured to cause a rotation driving force, about a first rotation axis eccentric from the wheel rotation axis in a radial direction of the wheel unit, to be applied to the wheel unit in a way to cause the traveling wheel to rotate about the wheel rotation axis;
       a second motor coupled to the wheel unit and configured to cause the wheel unit to rotate about the first rotation axis, wherein the second motor forms a cavity through which the first shaft passes; and
       a third motor configured to cause the wheel unit to rotate about a second rotation axis perpendicular to the first rotation axis.

* * * * *